(12) United States Patent
Segelmark et al.

(10) Patent No.: US 12,335,655 B2
(45) Date of Patent: Jun. 17, 2025

(54) THERMAL IMAGING ASSET INSPECTION SYSTEMS AND METHODS

(71) Applicant: FLIR Systems AB, Täby (SE)

(72) Inventors: Lukas Segelmark, Täby (SE); Anton Löf, Täby (SE); Erik Adam Urklinski, Täby (SE)

(73) Assignee: FLIR Systems AB, Täby (SE)

( * ) Notice: Subject to any disclaimer, the term of this patent is extended or adjusted under 35 U.S.C. 154(b) by 16 days.

(21) Appl. No.: 17/956,507

(22) Filed: Sep. 29, 2022

(65) Prior Publication Data

US 2023/0024701 A1 Jan. 26, 2023

Related U.S. Application Data

(63) Continuation of application No. PCT/US2021/025011, filed on Mar. 30, 2021.

(60) Provisional application No. 63/003,111, filed on Mar. 31, 2020.

(51) Int. Cl.
*H04N 5/33* (2023.01)
*G01J 5/48* (2022.01)
*G06T 7/70* (2017.01)

(52) U.S. Cl.
CPC .............. *H04N 5/33* (2013.01); *G01J 5/485* (2022.01); *G06T 7/70* (2017.01); *G06T 2207/10048* (2013.01)

(58) Field of Classification Search
None
See application file for complete search history.

(56) References Cited

U.S. PATENT DOCUMENTS

| | | | |
|---|---|---|---|
| 10,198,865 B2* | 2/2019 | Kezele | G02B 30/34 |
| 10,235,774 B1* | 3/2019 | Gitz | H04N 7/18 |
| 10,665,036 B1* | 5/2020 | Ha | G02B 27/017 |
| 10,719,993 B1* | 7/2020 | Ha | G06V 10/25 |

(Continued)

FOREIGN PATENT DOCUMENTS

KR 2020 0030317 A 3/2020

OTHER PUBLICATIONS

"Redesign how people interact with the world," web page <https://placenote.com/>, Placenote, 3 pages, Nov. 29, 2019, retrieved from Internet Archive Wayback Machine <https://web.archive.org/web/20191129072735/https://placenote.com/> on Dec. 27, 2022.

(Continued)

*Primary Examiner* — Stefan Gadomski
(74) *Attorney, Agent, or Firm* — Haynes and Boone, LLP

(57) ABSTRACT

Various techniques are provided performing temperature inspections of assets, such as temperature-sensitive industrial equipment. In one example, a method includes receiving, at a portable device, inspection instructions associated with an asset at a location in an environment. The method also includes displaying, at the portable device, the asset in an augmented reality format to guide a user of the portable device to the location. The method also includes capturing, by a thermal imager associated with the portable device, a thermal image of the asset when the thermal imager is aligned with the asset. The method also includes extracting, from the thermal image, at least one temperature measurement associated with the asset. Additional methods and systems are also provided.

20 Claims, 8 Drawing Sheets

(56) References Cited

U.S. PATENT DOCUMENTS

| | | | |
|---|---|---|---|
| 10,726,631 B1* | 7/2020 | Ha | G06T 7/73 |
| 10,789,778 B1* | 9/2020 | Li | G06V 20/20 |
| 10,846,534 B1* | 11/2020 | Furlan | G01S 19/39 |
| 2010/0225766 A1 | 9/2010 | Haigh et al. | |
| 2011/0216089 A1* | 9/2011 | Leung | G06T 7/35 |
| | | | 382/284 |
| 2013/0155248 A1 | 6/2013 | Neeley et al. | |
| 2015/0234454 A1* | 8/2015 | Kurz | G06T 19/006 |
| | | | 345/156 |
| 2017/0161955 A1* | 6/2017 | Li | G06F 1/163 |
| 2017/0364209 A1* | 12/2017 | Cheng | G06F 3/04845 |
| 2018/0053055 A1* | 2/2018 | Finding | G06T 19/006 |
| 2019/0141236 A1 | 5/2019 | Bergstrom et al. | |
| 2019/0311796 A1* | 10/2019 | Kim-Whitty | G16H 40/67 |
| 2020/0019781 A1 | 1/2020 | Smith et al. | |
| 2020/0249817 A1* | 8/2020 | Hasty | G06Q 50/10 |
| 2020/0311429 A1* | 10/2020 | Chen | A61B 5/1116 |
| 2021/0034870 A1* | 2/2021 | Ha | G06T 13/20 |

OTHER PUBLICATIONS

"Building the 3D Map of the World," web page <https://www.6d.ai/>, 6D.AI, 6 pages, Mar. 8, 2020, retrieved from Internet Archive Wayback Machine <https://web.archive.org/web/20200308033844/https://www.6d.ai/> on Dec. 27, 2022.

* cited by examiner

THERMAL IMAGING ASSET INSPECTION SYSTEMS AND METHODS

CROSS-REFERENCE TO RELATED APPLICATIONS

This application is a continuation of International Patent Application No. PCT/US2021/025011 filed Mar. 30, 2021 and entitled "THERMAL IMAGING ASSET INSPECTION SYSTEMS AND METHODS," which claims priority to and the benefit of U.S. Provisional Patent Application No. 63/003,111 filed Mar. 31, 2020 and entitled "THERMAL IMAGING ASSET INSPECTION SYSTEMS AND METHODS," all of which are hereby incorporated by reference in their entirety.

TECHNICAL FIELD

The present invention relates generally to temperature measurement and, more particularly, to asset inspection using thermal imaging.

BACKGROUND

In industrial environments such as manufacturing facilities or other locations, there is often a need to inspect various assets such as machines, electronics, or other devices. In many cases, the assets may be temperature-sensitive and therefore required to operate at temperatures within expected tolerances to facilitate ongoing reliable functionality. For example, if an asset exhibits a temperature that is too high or too low, this may indicate a fault in need of repair.

Various conventional techniques exist for monitoring assets. In some cases, large numbers of sensors or fixed camera systems may be installed throughout a facility. However, such implementations can require significant investments in infrastructure and may be cost prohibitive. Moreover, the fixed nature of such implementations can limit their ability to monitor all relevant assets in a given environment.

In other cases, a user may be required to manually inspect the assets. However, this approach can be subject to human error as it puts the responsibility on the user to remember which assets to inspect and to properly record the resulting temperature data. Accordingly, there is a need for an improved approach to asset temperature monitoring.

SUMMARY

Various techniques are disclosed to provide for improved temperature monitoring of assets by a portable imaging system that may be used to capture thermal images of assets at consistent locations within an environment. In some embodiments, the imaging system may be equipped with position sensing features to detect the absolute and/or relative position of the imaging system in relation to monitored assets (e.g., through use of a three dimensional map, relative position to objects, and/or other techniques).

As a result, thermal images may be captured at consistent locations in a repeatable manner such that historical temperature measurements can be reliably determined and compared with each other to ascertain temperature trends, potential fault conditions, and/or other conditions.

In some embodiments, an imaging system may include instructions to guide a user to the locations of assets and provide realtime feedback to the user (e.g., with tactile, visual, and/or audible indications or instructions) regarding the correct position of the imaging system to be used when capturing thermal images.

In some embodiments, an imaging system may identify virtual hotspots and/or measurement areas to cause the imaging system to automatically capture images of an asset when the imaging system reaches a particular position.

In one embodiment, a method includes receiving, at a portable device, inspection instructions associated with an asset at a location in an environment; displaying, at the portable device, the asset in an augmented reality format to guide a user of the portable device to the location; capturing, by a thermal imager associated with the portable device, a thermal image of the asset when the thermal imager is aligned with the asset; and extracting, from the thermal image, at least one temperature measurement associated with the asset.

In another embodiment, a system includes a portable device comprising: a thermal imager; a display; and a logic device configured to: receive inspection instructions associated with an asset at a location in an environment, present, on the display, the asset in an augmented reality format to guide a user of the portable device to the location, operate the thermal imager to capture a thermal image of the asset when the thermal imager is aligned with the asset, and extract, from the thermal image, at least one temperature measurement associated with the asset.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
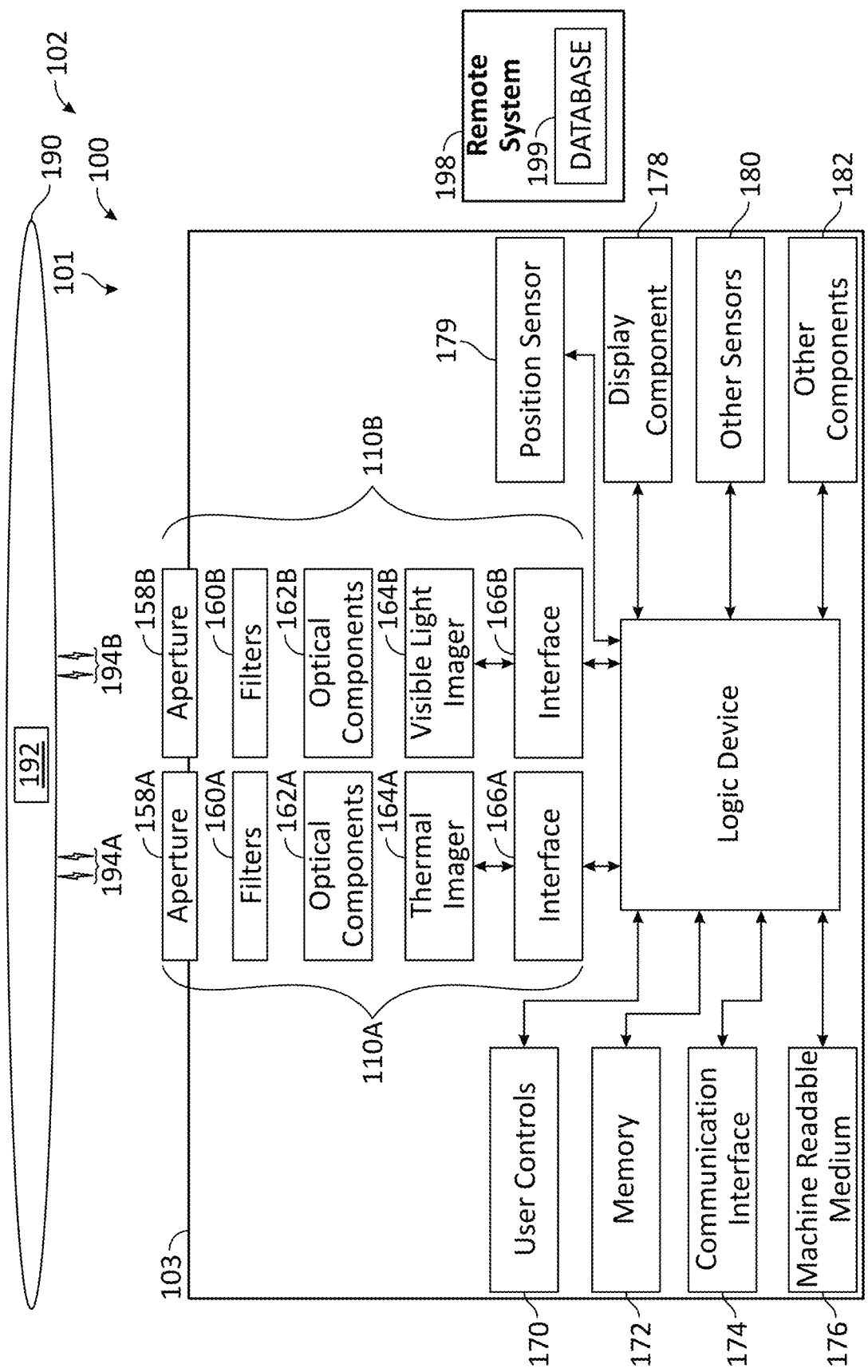
FIG. 1 illustrates a block diagram of an imaging system and a remote system in accordance with an embodiment of the disclosure.

FIG. 1 illustrates a block diagram of an inspection system 100 comprising a portable device 101 and a remote system 198 in accordance with an embodiment of the disclosure. In some embodiments, portable device 101 may be implemented, for example, as a handheld camera system, a small form factor camera system provided as part of part of and/or an attachment to a personal electronic device such as a smartphone, or as another device.

Portable device 101 may be positioned to receive infrared radiation 194A and visible light radiation 194B from a scene 190 (e.g., corresponding to a field of view of portable device 101) in an environment 102 (e.g., a workplace, warehouse, industrial site, manufacturing facility, or other environment). In various embodiments, scene 190 may include one or more physical assets 192 (e.g., temperature-sensitive machines, electronics, or other devices) of interest which may be captured in thermal images and/or visible light images by portable device 101. Although a single example asset 192 is illustrated in FIG. 1, any desired number of assets may be inspected in accordance with the techniques of the present disclosure.

As shown, portable device 101 includes a housing 103 (e.g., a camera body graspable by a user), a thermal imaging subsystem 110A, a visible light imaging subsystem 110B, a logic device 168, user controls 170, a memory 172, a communication interface 174, a machine readable medium 176, a display 178, a position sensor 179, other sensors 180, and other components 182.

Thermal imaging subsystem 110A and visible light imaging subsystem 110B may be used to capture thermal images and visible light images in response to infrared radiation 194A and visible light radiation 194B, respectively, received from a scene 190.

Thermal imaging subsystem 110A may include an aperture 158A, filters 160A, optical components 162A, a thermal imager 164A, and a thermal imager interface 166A. In this regard, infrared radiation 194A passing through aperture 158A may be received by filters 160A that selectively pass particular thermal wavelength ranges (e.g., wavebands) of infrared radiation 194A. Optical components 162A (e.g., an optical assembly including one or more lenses, additional filters, transmissive windows, and/or other optical components) pass the filtered infrared radiation 194A for capture by thermal imager 164A.

Thermal imager 164A may capture thermal images of scene 190 in response to the filtered infrared radiation 194A. Thermal Imager 164A may include an array of sensors (e.g., microbolometers) for capturing thermal images (e.g., thermal image frames) of scene 190. In some embodiments, thermal imager 164A may also include one or more analog-to-digital converters for converting analog signals captured by the sensors into digital data (e.g., pixel values) to provide the captured images. Thermal imager interface 166A provides the captured images to logic device 168 which may be used to process the images, store the original and/or processed images in memory 172, and/or retrieve stored images from memory 172.

Visible light imaging subsystem 110B may include an aperture 158B, filters 160B, optical components 162B, a visible light imager 164B, and a visible light imager interface 166A. It will be appreciated that the various components of visible light imaging subsystem 110B may operate in an analogous manner as corresponding components of thermal imaging subsystem 110A with appropriate technology for capturing visible light images.

Moreover, although particular components are illustrated for each of thermal imaging subsystem 110A and visible light imaging subsystem 110B, it will be understood that the illustrated components are provided for purposes of example. As such, greater or fewer numbers of components may be used in each subsystem as appropriate for particular implementations.

Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of portable device 101 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of portable device 101 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of portable device 101 and/or separate from portable device 101, with stored instructions provided to portable device 101 by coupling the machine readable medium 176 to portable device 101 and/or by portable device 101 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of portable device 101. Logic device 168 may be configured to display images and information on display 178. For example, logic device 168 may be configured to retrieve images and information from memory 172 and provide images and information to display 178 for presentation to the user of portable device 101. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom. In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of portable device 101, such as auto-focus, menu enable and selection, field of view (FoV), brightness, contrast, gain, offset, spatial, temporal, and/or various other features and/or parameters.

Position sensor 179 may be implemented as any appropriate type of device used to determine a position (e.g., location) of portable device 101 in environment 102 (e.g., in an industrial facility containing assets 192 to be monitored). For example, in various embodiments, position sensor 179 may be implemented as a global positioning system (GPS) device, motion sensors (e.g., accelerometers, vibration sensors, gyroscopes, and/or others), depth sensing systems (e.g., time of flight cameras, LiDAR scanners, thermal cameras, visible light cameras, and/or others), antennas, other devices, and/or any combination thereof as desired. In some embodiments, position sensor 179 may send appropriate signals to logic device 168 for processing to determine the absolute and/or relative position of portable device 101 in environment 102.

Portable device 101 may include various types of other sensors 180 including, for example, temperature sensors and/or other sensors as appropriate.

Logic device 168 may be configured to receive and pass images from thermal and visible light imager interfaces 166A-B, additional data from position sensor 179 and sensors 180, and control signal information from user controls 170 to one or more external devices such as remote system 198 through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, portable device 101 and/or its individual associated components may be associated with a particular network link such as for example a URL (Uniform Resource Locator), an IP (Internet Protocol) address, and/or a mobile phone number.

Portable device 101 may include various other components 182 such as speakers, displays, visual indicators (e.g., recording indicators), vibration actuators, a battery or other power supply (e.g., rechargeable or otherwise), and/or additional components as appropriate for particular implementations.

Although various features of portable device 101 are illustrated together in FIG. 1, any of the various illustrated components and subcomponents may be implemented in a distributed manner and used remotely from each other as appropriate. For example, remote system 198 may be implemented with any of the various components of portable device 101. Remote system 198 may communicate with portable device 101 to send and receive data therewith, perform remote processing for portable device 101, and/or other tasks (e.g., through appropriate communication interfaces 174 of portable device 101 and/or of remote system 198). For example, in some embodiments, thermal images, visible light images, position data, and/or additional information obtained by portable device 101 may be communicated to remote system 198 for further processing and/or storage. In this regard, remote system 198 may include a database 199 (e.g., maintained in an appropriate memory 172 of remote system 198) used for storage and recall of various images and/or other information to monitor historical temperatures of assets 192.

Figure 2:
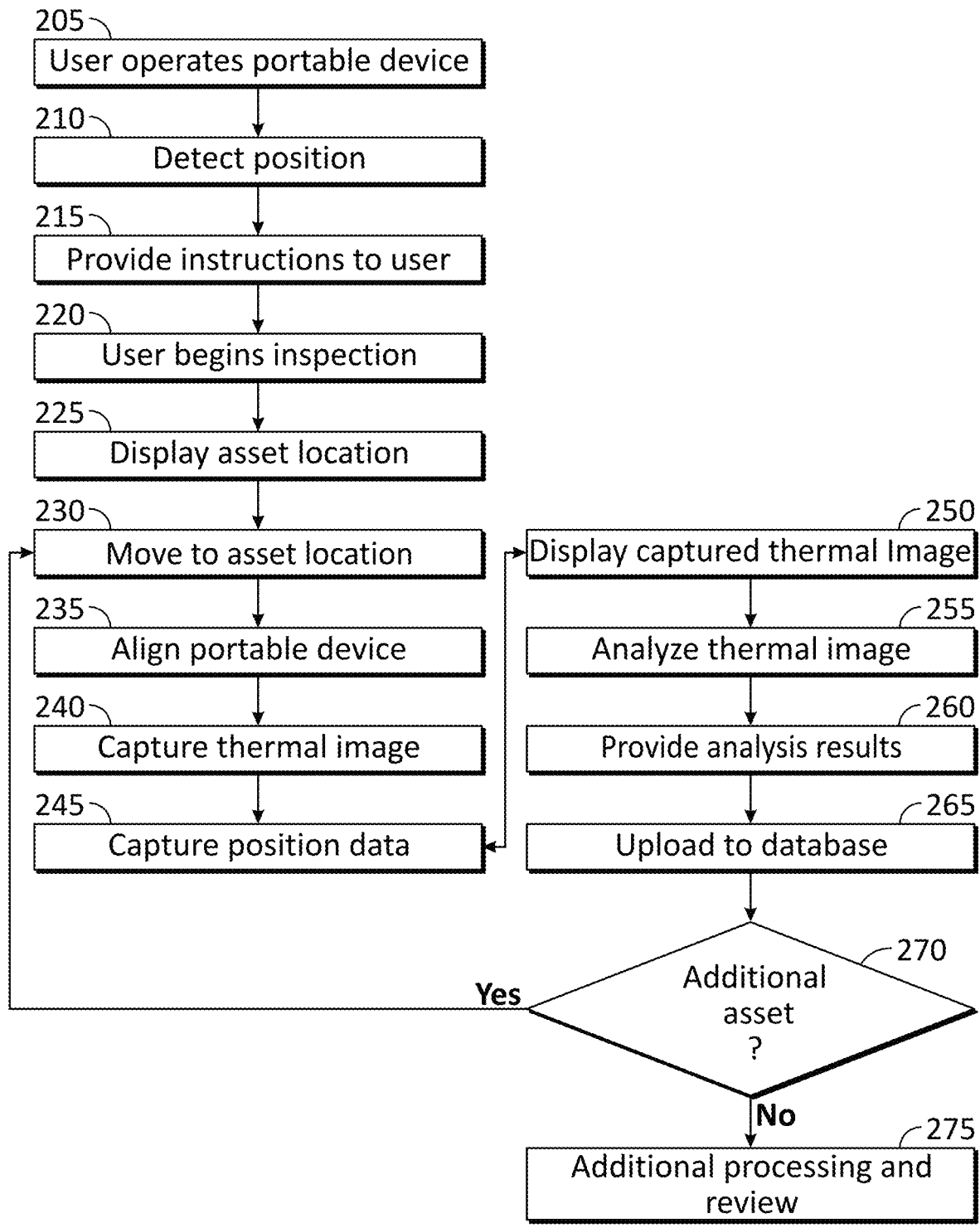
FIG. 2 illustrates a process of monitoring assets in accordance with an embodiment of the disclosure.

FIG. 2 illustrates a process of monitoring assets 192 in accordance with an embodiment of the disclosure. For example, in some embodiments, the process of FIG. 2 may be performed by a user (e.g., an operator) in connection with portable device 101 and/or remote system 198 to obtain thermal images and/or visible light images of various assets 192 in environment 102. Although various operations of FIG. 2 will be discussed as being performed by portable device 101, such operations may be alternatively be performed by remote system 198 and/or both portable device 101 and remote system 198 as appropriate using transfer of thermal images, visible light images, and/or additional information therebetween.

In block 205, the user begins operating portable device 101. For example, in the case of a portable camera system implementation, the user may turn on portable device 101 for operation.

In block 210, portable device 101 detects its current position. For example, in some embodiments, position sensor 179 may detect the current position and provide appropriate signals to logic device 168 to identify and present the current position to the user on display 178. In some embodiments, portable device 101 may detect the current position based on analysis of thermal images and/or visible light images captured in realtime as portable device 101 is moved within environment 102 by the user.

Although block 210 is illustrated as a single block, in some embodiments, portable device 101 may repeatedly (e.g., continuously) detect its current position throughout the process of FIG. 2. As a result, portable device 101 may determine is current position on an ongoing basis as the user moves portable device 101 throughout environment 102.

In block 215, portable device 101 obtains and presents asset inspection instructions to the user on display 178. For example, in some embodiments, portable device 101 may be programmed with (or receive from remote system 198) a map, three dimensional model, checklist, and/or information in another format identifying one or more assets 192 to be measured in environment 102.

Figure 3A:
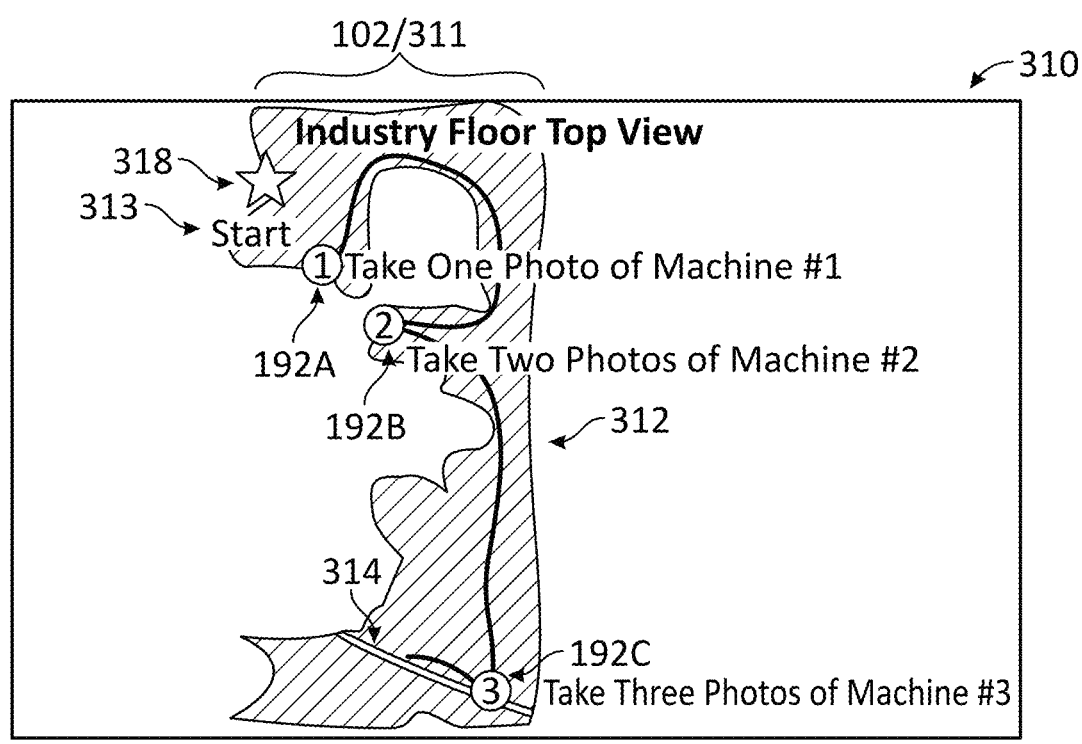
FIG. 3A illustrates asset inspection instructions provided to a user in accordance with an embodiment of the disclosure.

For example, FIG. 3A illustrates asset inspection instructions 310 provided to a user in accordance with an embodiment of the disclosure. As shown in FIG. 3A, instructions 310 include a map 311 that provides a top view of environment 102 (e.g., an industrial facility in this embodiment). Map 311 identifies a route 312 that a user may traverse through environment 102 in order to capture thermal images of various assets 192. In particular, route 312 includes a start point 313, an end point 314, and waypoints (e.g., virtual inspection points) corresponding to particular assets 192A, 192B, 192C (identified as Machine #1, Machine #2, and Machine #3, respectively). Although only three assets 192A-C are identified in instructions 310, greater or fewer numbers of assets 192 are contemplated in various embodiments. In some embodiments, instructions 310 may also be searchable by the user to rapidly ascertain particular information as desired.

As discussed with respect to block 210, portable device 101 has detected its position within environment. Accordingly, portable device 101 may further superimpose its current position 318 on instructions 310 as shown in FIG. 3A. In addition, portable device 101 may also store position data associated with route 312 and assets 192A-C and may therefore determine its relative position in relation thereto.

In block 220, the user begins (e.g., initiates) an inspection in accordance with instructions 310. For example, the user may select an appropriate user control 170 to acknowledge instructions 310 and begin following them.

In block 225, portable device 101 provides the user with the location of the first asset 192A to be inspected. For example, in some embodiments, portable device 101 may operate one or both of imaging subsystems 110A-B to capture images of environment 102. As a result, portable device 101 may superimpose location information (e.g., graphics, text, and/or other information) on the captured images corresponding to the location of one or more assets 192A-C to display assets 192A-C in an augmented reality format. In various embodiments, portable device 101 may display additional information associated with the assets 192A-C as appropriate. In this regard, portable device 101 may maintain such information locally and/or may receive it from remote system 198.

Figure 3B:
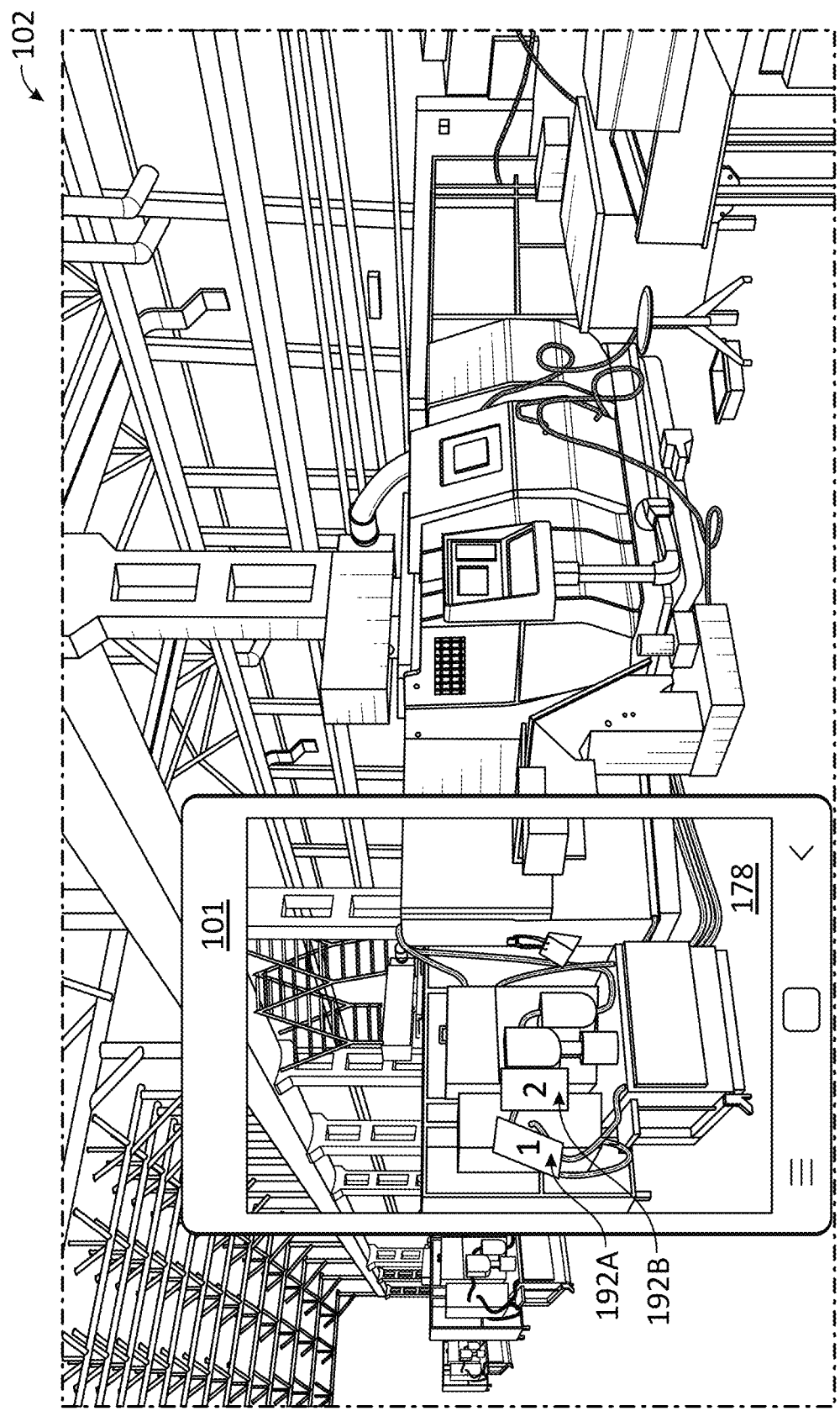
FIG. 3B illustrates an imaging system with assets identified in an augmented reality format in accordance with an embodiment of the disclosure.

FIG. 3B illustrates portable device 101 with particular assets 192A and 192B identified in an augmented reality format in accordance with an embodiment of the disclosure. In some embodiments, the representation of assets 192A-C in FIGS. 3B-F may correspond to virtual inspection points (e.g., locations in environment 102 where portable device 101 may be positioned to capture temperature measurements using thermal images. For example, such virtual inspection points may correspond to particular portions of equipment to be inspected (e.g., multiple virtual inspection points may be provided for a single piece of equipment). Thus, it will be appreciated that the physical locations of assets 192A-C may vary from the virtual inspection points (e.g., vantage points of portable device 101) in some embodiments.

As shown in FIG. 3B, portable device 101 is positioned in environment 102 (e.g., an industrial facility in this embodiment). As also shown, display 178 of portable device 101 is presenting visible light images captured of scene 190 in the environment 102 in realtime. In this case, portable device 101 is in proximity to assets 192A and 192B which are identified through graphics "1" and "2" superimposed on the visible light images in an augmented reality format. As a result, the user may easily ascertain the location of assets 192A and 192B as the user traverses route 312 in accordance with instructions 310.

Accordingly, in block 230, the user moves toward the location of the first asset 192A along route 312, translating portable device 101 (e.g., a portable camera system in this embodiment) with the user through environment 102 in order to align a field of view of portable device 101 with asset 192A. Conveniently, the user may be aided by the augmented reality presentation of asset 192A as shown and discussed with regard to FIG. 3B. Moreover, as the user moves toward the location of asset 192A, the augmented reality presentation may be updated as additional images are captured and the position of portable device 101 is updated. For example, in some embodiments, portable device 101 may maintain a three dimensional model of environment 102 and may track the position of portable device 101 within the three dimensional model as portable device 101 is moved within environment 102 by the user.

Figure 3C:
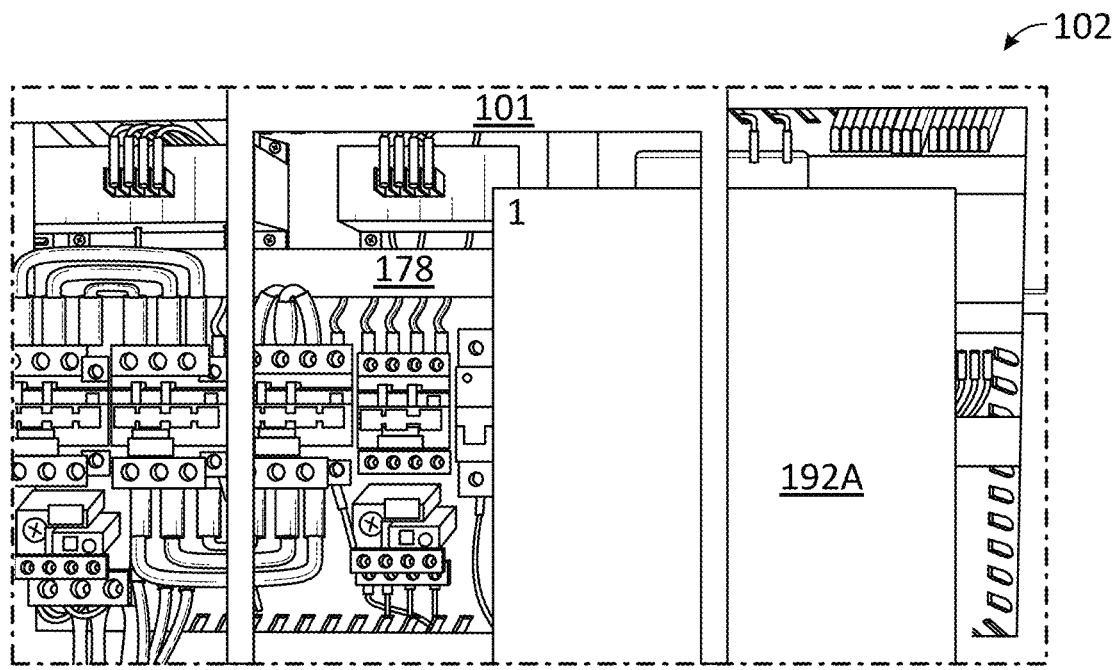
FIG. 3C illustrates an imaging system with an asset identified in an augmented reality format in a closeup view in accordance with an embodiment of the disclosure.

For example, FIG. 3C illustrates portable device 101 with asset 192A identified in an augmented reality format in a closeup view in accordance with an embodiment of the disclosure. In this case, portable device 101 is near asset 192A, but has not yet been aligned with the virtual inspection point for capturing a thermal image thereof. For example, as shown in FIG. 3C, asset 192A is only partially within the field of view (e.g., scene 190) of portable device 101.

Accordingly, in block 235, the user aligns portable device 101 such that position of portable device 101 is aligned with the location of asset 192A (e.g., the field of view of infrared imaging subsystem 110A corresponds to the virtual inspection point for the location of asset 192A). In this regard, the user may utilize the realtime augmented reality presentation of asset 192A to adjust the position of portable device 101 until asset 192A is fully shown on display 178. In some embodiments, portable device 101 may perform MSX processing in block 235 to assist with the user's alignment of portable device 101 in relation to one or more assets 192 (e.g., to provide a guide outline overlaid on a visible light image) to assist the user with alignment. Examples of such processing are further discussed with regard to block 420. In some embodiments, portable device 101 may provide tactile, audible, and/or visual feedback to guide the user in aligning portable device 101.

Figure 3D:
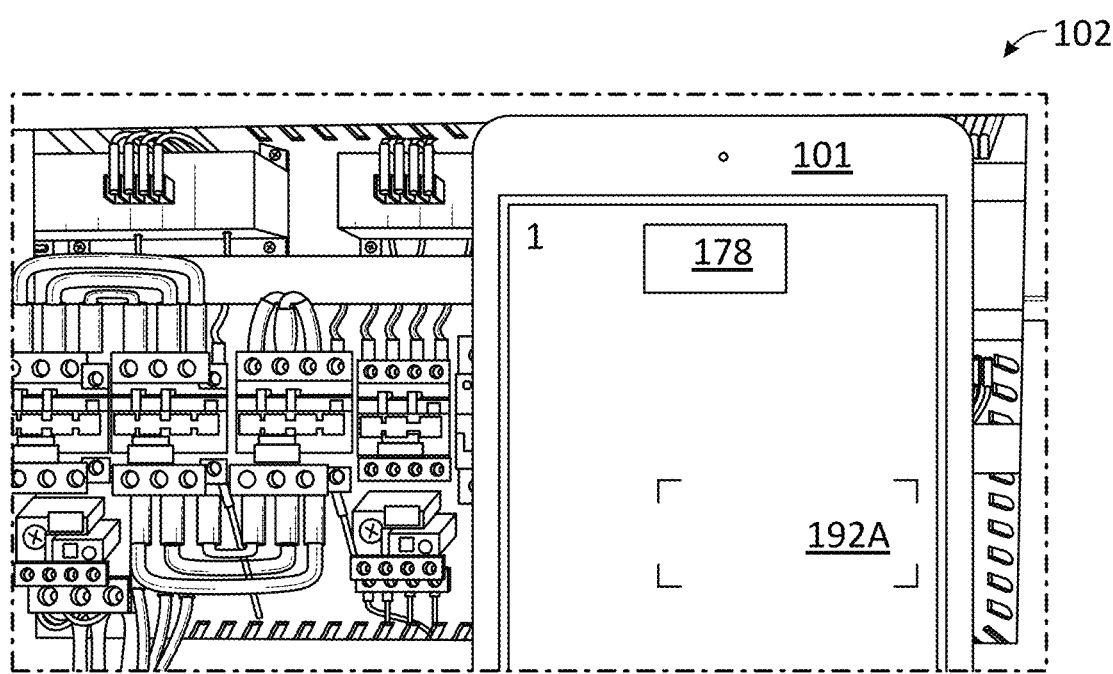
FIG. 3D illustrates an imaging system with an asset identified in an augmented reality format aligned for capturing a thermal image in accordance with an embodiment of the disclosure.

For example, FIG. 3D illustrates imaging system 110 with asset 192A identified in an augmented reality format aligned for capturing a thermal image in accordance with an embodiment of the disclosure. As shown in FIG. 3D, the augmented reality presentation of asset 192A is fully contained within the borders of display 178. In addition, the precise physical location (e.g., labeled GR.FS120) of asset 192A within the augmented reality graphic "1" is further identified on display 178. Thus, it will be appreciated that portable device 101 is now sufficiently aligned to capture one or more thermal images of asset 192A for temperature monitoring purposes. In some embodiments, portable device

101 may verify the alignment with asset 192A by capturing and analyzing appropriate thermal or visible light images. For example, portable device 101 may capture one or more thermal or visible light images of asset 192A and indicate to the user when sufficient data has been gathered.

In some embodiments, various settings of portable device 101 may be set automatically for thermal or visible light image capture (e.g., integration time, shutter speed, and/or other settings) based on the detected position of thermal portable device 101. In some embodiments, specific thermal settings may be set for different parts of thermal images (e.g., different emissivity settings for different locations) and various thermal measurement operations may be set (e.g., spot, box, and line measurements in the thermal images). In various embodiments, any of these settings may be predefined and/or may be set using previous measurements as templates. As a result, images captured of asset 192A may be effectively captured with high precision.

In block 240, after the alignment is performed, portable device 101 captures a thermal image of asset 192A using thermal imaging subsystem 110A. In block 245, portable device 101 captures position data identifying the position of portable device 101 at the time of thermal image capture. In some embodiments, block 245 may be performed during (e.g., simultaneously or in close temporal proximity to) block 240. Additional information such as time and/or other information may also be captured in block 245 as desired. As a result, portable device 101 and/or remote system 198 may store the captured thermal image, one or more temperature information (e.g., measurements) extracted from the thermal image, and/or additional information (e.g., position, time, and/or other information) associated with the thermal image capture to provide an inspection record of asset 192A.

In some embodiments, block 245 may include recording the position (e.g., spatial position in x, y, z coordinates or otherwise) and time associated with each pixel in the captured thermal image. As a result, the temperature associated with each pixel may be mapped in a multi-dimensional representation of environment 102 as further discussed herein.

In some embodiments, block 240 and/or 245 may be performed automatically by portable device 101 (e.g., triggered by logic device 168) after logic device 168 detects that thermal imager 164A is aligned with asset 192A, for example, based on a detected position of portable device 101, analysis of one or more realtime thermal or visible light images captured of asset 192A, and/or otherwise. In some embodiments, block 240 and/or 245 may be performed by portable device 101 in response to the user's operation of one or more user controls 170.

Figure 3E:
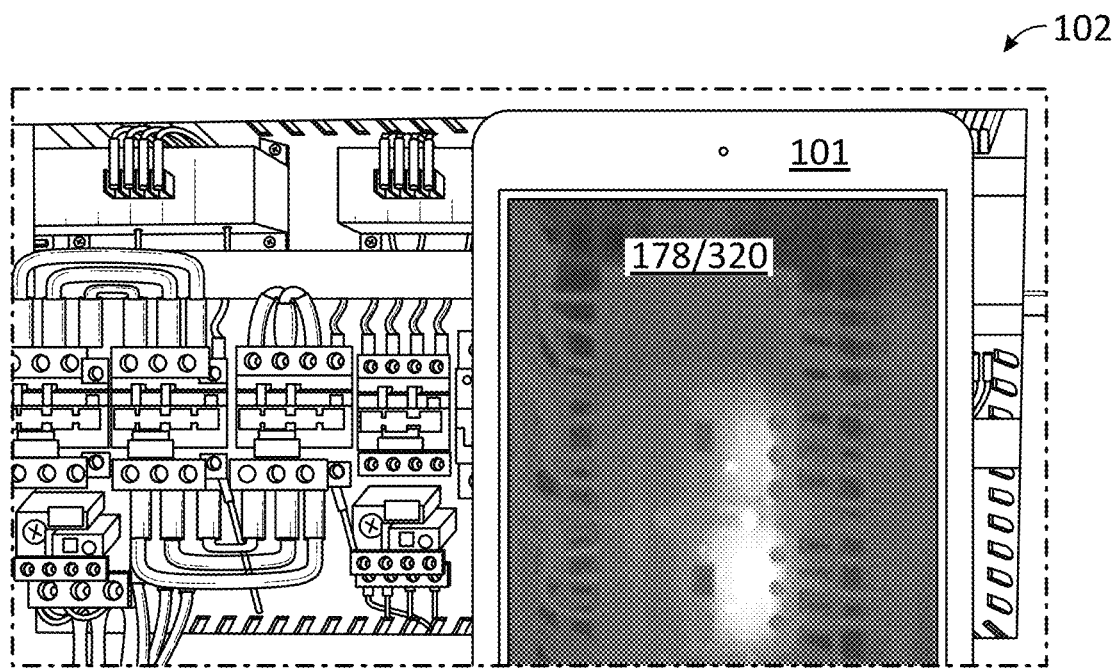
FIG. 3E illustrates an imaging system displaying a captured thermal image of an asset in accordance with an embodiment of the disclosure.

In block 250, portable device 101 presents the captured thermal image on display 178 for the user's review. For example, FIG. 3E illustrates portable device 101 displaying a captured thermal image 320 of asset 192A in accordance with an embodiment of the disclosure.

In block 255, portable device 101 analyzes the captured thermal image 320. Such analysis may include, for example, extraction of temperature information from thermal image 320 (e.g., temperatures associated with one or more pixels of thermal image 320) and comparing such information to expected temperature ranges and/or historical temperature data. For example, in various embodiments, the thermal image 320 may processed such that different points in space can be graphed or trended, images can be compared visually to a baseline, and can be processed by appropriate machine learning processes.

In some embodiments, the analysis of block 255 may include comparison of the captured thermal image 320 with previously captured thermal and/or visible light images of asset 192A to determine whether asset 192A was accurately captured.

In block 260, portable device 101 provides the results of the analysis to the user on display 178. For example, in some embodiments, portable device 101 may display temperature information associated with asset 192A extracted from thermal image 320.

Figure 3F:
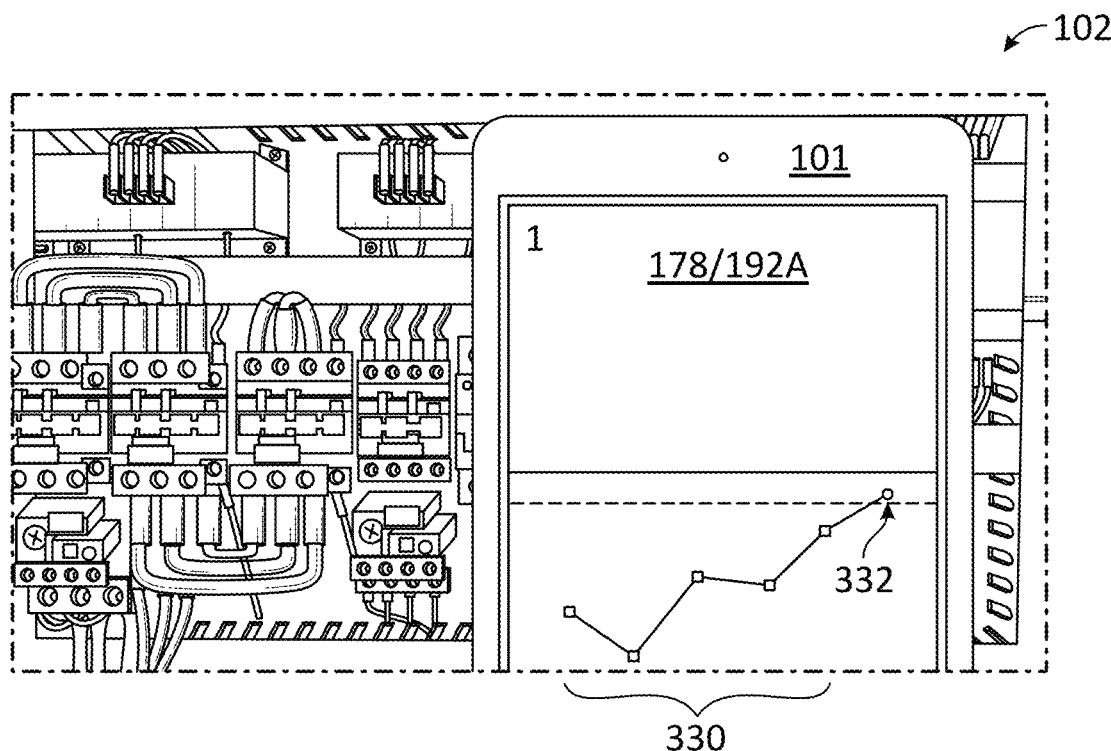
FIG. 3F illustrates an imaging system displaying historical temperature readings of an asset in accordance with an embodiment of the disclosure.

In some embodiments, portable device 101 may further display historical temperature data associated with asset 192A to permit the user to rapidly determine whether the current temperature is within normal or expected historical temperature ranges (e.g., while portable device 101 is positioned at the location of asset 192A). For example, FIG. 3F illustrates portable device 101 presenting historical temperature readings 330 and a current temperature reading 332 associated with asset 192A on display 178 in accordance with an embodiment of the disclosure. Also in block 260, if the temperature associated with asset 192A is outside of an expected range, portable device 101 may display one or more notifications (e.g., warnings, alerts, and/or other information) as appropriate to inform the user of the same. In some embodiments, such information may be presented to the user in an augmented reality format.

In block 265, portable device 101 uploads the captured thermal image 320, position data, time, and/or other information to remote system 198 for storage and further processing.

In block 270, portable device 101 determines whether any additional assets 192 remain to be inspected. For example, the scenario discussed above, asset 192A has been inspected but assets 192B and 192C remain to be inspected. In this case, the process returns to block 230 where the user moves to the location of the next asset (e.g., asset 192B) along route 312. After all assets have been inspected, the process continues to block 275 where additional analysis may be performed as further discussed herein.

Although the process of FIG. 2 has been discussed primarily in relation to the capture of thermal images by infrared imaging subsystem 110A, the process may also include the capture of visible light images of assets 192 by visible light imaging subsystem 110B. For example, in some embodiments, a visible light image may also be captured in block 240 during (e.g., simultaneously with or in close temporal proximity to) the capture of the thermal image. In this regard, portable device 101 may capture both thermal and visible light images of the same asset 192 at the same (or close to the same) time. The visible light image may be similarly displayed, analyzed, and/or uploaded where appropriate in a similar manner as discussed with regard to the thermal image. As a result, in some embodiments, remote system 198 may be provided with both thermal and visible light images corresponding to the same asset 192 for additional analysis as further discussed herein.

Figure 4:
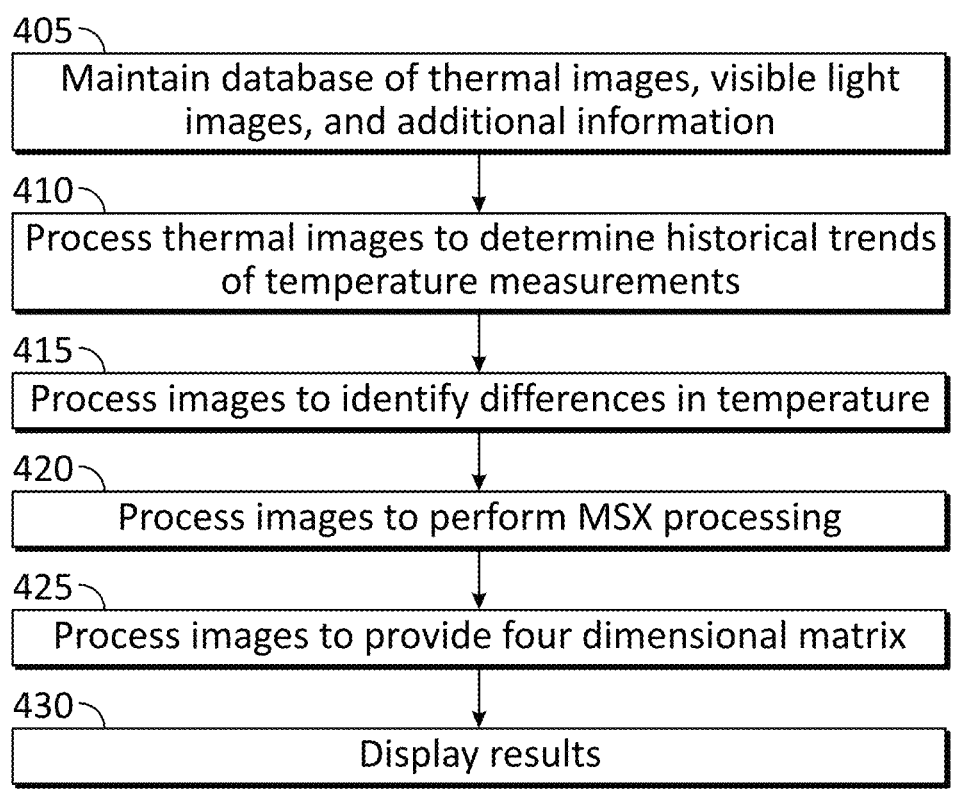
FIG. 4 illustrates a process of performing additional analysis on information stored for one or more assets in accordance with an embodiment of the disclosure.

FIG. 4 illustrates a process of performing additional analysis on information stored in database 199 of remote system 198 for one or more assets in accordance with an embodiment of the disclosure. For example, the process of FIG. 4 may be performed in block 275 of FIG. 2.

Figure 5:
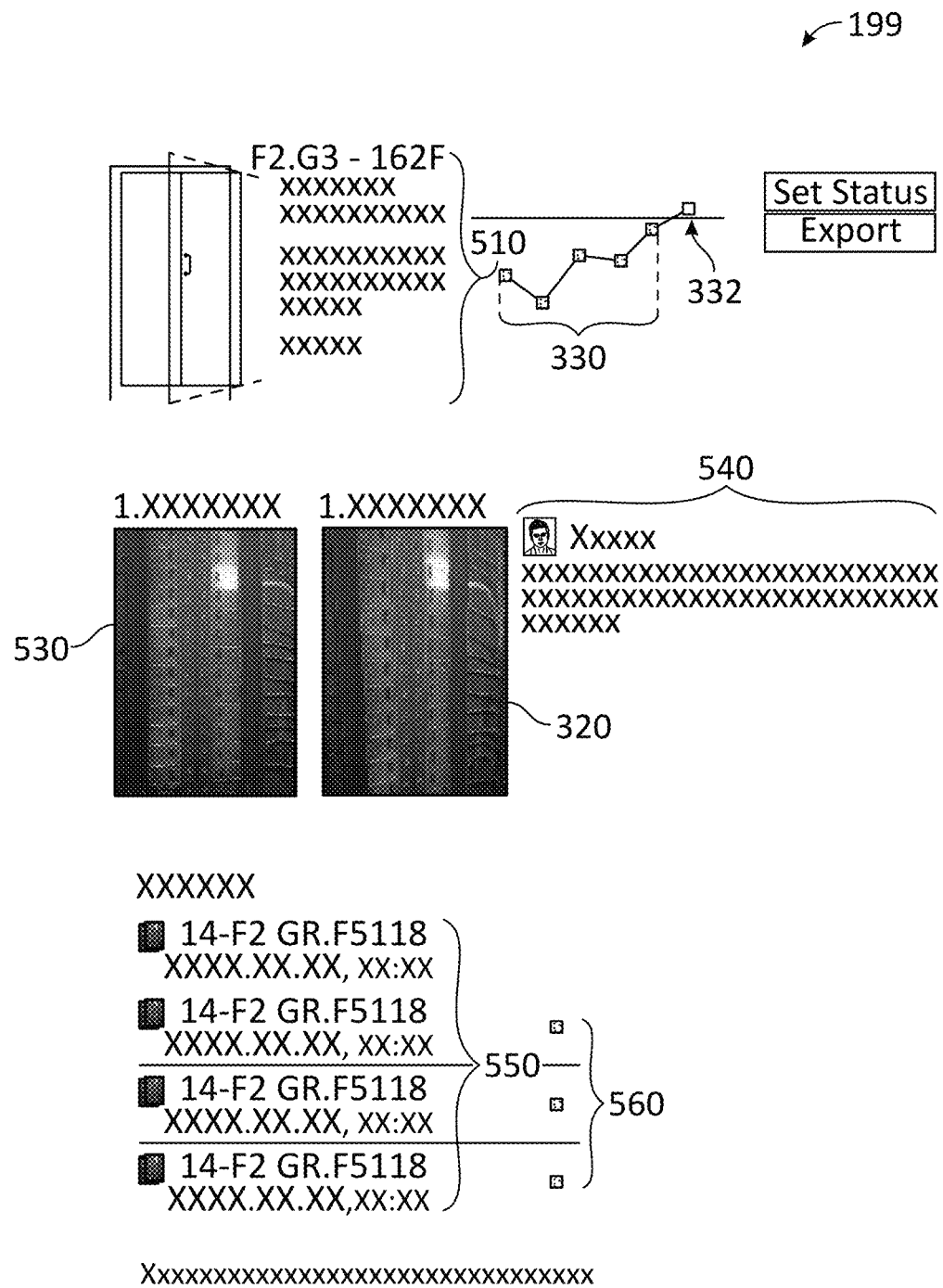
FIG. 5 illustrates information stored in a database for an asset in accordance with an embodiment of the disclosure.

In block 405, remote system 198 maintains database 199 of thermal images, visible light images, and/or other information associated with one or more assets 192 as discussed. For example, FIG. 5 illustrates information stored for asset 192A in database 199 of remote system 198 in accordance with an embodiment of the disclosure. As shown in FIG. 5, database 199 may include various information for asset 192A including: descriptive and status information 510 for the equipment associated with asset 192A, historical temperature readings 330 and current temperature reading 332, recent thermal image 320, previous thermal image 530, user comments 540, and additional previous thermal images 550 with their associated alert conditions 560. Additional information (e.g., position information, time, visible light images, and/or other information) may also be stored as appropriate.

Blocks 410 to 425 identify various processing that may be performed on the information in database 199, for example, in response to user queries provided to remote system 198. Although particular processing is illustrated in a sequential manner, this is only for purposes of example and any desired processing may be performed in any desired order. Moreover, although such processing is primarily discussed as being performed by remote system 198, any or all of the operations discussed in FIG. 4 may be performed by portable device 101, remote system 198, and/or distributed therebetween.

In block 410, thermal images 520/530/550 are processed to extract temperature measurements and determine historical temperature trends as discussed with regard to FIG. 3F.

In block 415, recent thermal image 320 is processed in relation to one or more previous thermal images 530/550 to identify one or more differences in temperature over the one or more previous thermal images 530/550. As a result, the processed version of recent thermal image 320 may be conveniently reviewed to easily ascertain recent changes in temperature associated with asset 192A.

In block 420, one or more of thermal images 320/530/550 are processed in relation to one or more visible light images (e.g., captured as previously discussed) to generate a combined image comprising thermal image content and visible light image content. In some embodiments, the processing performed in block 420 may include any of the various techniques set forth in U.S. Pat. Nos. 8,520,970, 8,565,547, 8,749,635, 9,171,361, 9,635,285, and/or 10,091,439, all of which are hereby incorporated by reference in their entirety. In some embodiments, such processing may include, for example, contrast enhancement processing (e.g., also referred to as MSX processing, high contrast processing, and/or fusion processing), true color processing, triple fusion processing, alpha blending, and/or other processing as appropriate.

As discussed, block 245 may include the recording of the position and time associated with each pixel of a captured thermal image. Accordingly, in block 425, one or more of thermal images 320/530/550 are processed to provide a four dimensional (three dimensional space and time) matrix representation of temperatures associated with any of assets 192A-C. As a result, the temperature associated with each pixel may be mapped and reviewed in a four dimensional environment.

In block 430, the results of the processing of blocks 410 to 425 are displayed by portable device 101 and/or remote system 198.

In view of the present disclosure, it will be appreciated that the various techniques provided herein permit temperature measurements to be performed conveniently by a user of a low cost portable device 101 without requiring extensive hardware sensors or related equipment. In addition, such techniques do not require significant training of the user. For example, appropriate processing and artificial intelligence may be implemented in portable device 101 and/or remote system 198 to provide targeting applications for unique use cases that lower the threshold of instruction and education required to use thermal imaging.

In some embodiments, the augmented reality format provided to the user may be customized for particular use cases. In addition, the instructions 310 provided to the user may interact with high precision indoor navigation techniques (e.g., provided by position sensor 179) and appropriate navigation processes for natural navigation by the user through environment 102.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving, at a communication interface of a portable device, inspection instructions associated with an asset at a location in an environment;
displaying, at a display of the portable device, the asset in an augmented reality format to guide a user of the portable device to the location in accordance with the inspection instructions;
detecting an alignment of the thermal imager with the asset;
adjusting settings of the thermal imager in response to the detected alignment;
capturing, by a thermal imager associated with the portable device and in response to the detected alignment, a thermal image of the asset when a field of view of the thermal imager is aligned with a virtual inspection point for the location of the asset in accordance with the inspection instructions; and
extracting, from the thermal image, at least one temperature measurement associated with the asset.

2. The method of claim 1, further comprising:
translating the portable device through the environment to the location;
detecting a position of the portable device during the translating; and updating the asset in the augmented reality format in response to the detected position to further guide the user.

3. The method of claim 1, further comprising:
detecting a time and a three dimensional position of the portable device during the capturing of the thermal image; and
storing the temperature measurement, the time, and the three dimensional position in a database as an inspection record of the asset.

4. The method of claim 1, wherein:
the extracting comprises extracting a plurality of temperature measurements associated with corresponding pixels of the thermal image;
each pixel is associated with a corresponding three dimensional position in the environment and a time; and
the method further comprises generating a four dimensional matrix associating the temperature measurements with the corresponding three dimensional positions and times.

5. The method of claim 1, further comprising displaying on the display of the portable device a notification that the temperature measurement is outside an expected range and/or a plurality of previous temperature measurements associated with the asset.

6. The method of claim 1, further comprising:
comparing the thermal image to a previous thermal image captured of the asset;
processing the thermal image to identify temperature differences between the thermal image and the previous thermal image; and
displaying on the display of the portable device the processed thermal image.

7. The method of claim 1, further comprising repeating the method of claim 1 for a plurality of assets.

8. The method of claim 1, wherein the imaging device is a handheld thermal imaging camera.

9. The method of claim 1, wherein the environment is an industrial facility and the asset is temperature-sensitive industrial equipment.

10. A system comprising:
a portable device comprising:
a thermal imager;
a display; and
a logic device configured to:
receive inspection instructions associated with an asset at a location in an environment,
present, on the display, the asset in an augmented reality format to guide a user of the portable device to the location in accordance with the inspection instructions,
detect an alignment of the thermal imager with the asset,
adjust settings of the thermal imager in response to the detected alignment,
operate the thermal imager, in response to the detected alignment, to capture a thermal image of the asset when a field of view of the thermal imager is aligned with a virtual inspection point for the location of the asset in accordance with the inspection instructions, and
extract, from the thermal image, at least one temperature measurement associated with the asset.

11. The system of claim 10, wherein:
the portable device is configured to be translated through the environment to the location; and
the logic device is configured to:
detect a position of the portable device while being translated, and
update the asset in the augmented reality format in response to the detected position to further guide the user.

12. The system of claim 10, wherein:
the portable device is configured to detect a time and a three dimensional position of the portable device during the capture of the thermal image; and
the system further comprises a database configured to store the temperature measurement, the time, and the three dimensional position in a database as an inspection record of the asset.

13. The system of claim 10, wherein:
the logic device is configured to extract a plurality of temperature measurements associated with corresponding pixels of the thermal image;
each pixel is associated with a corresponding three dimensional position in the environment and a time; and
the system is configured to generate a four dimensional matrix associating the temperature measurements with the corresponding three dimensional positions and times.

14. The system of claim 10, wherein the portable device is configured to present, on the display, a notification that the temperature measurement is outside an expected range and/or a plurality of previous temperature measurements associated with the asset.

15. The system of claim 10, wherein the system is configured to:
compare the thermal image to a previous thermal image captured of the asset;
process the thermal image to identify temperature differences between the thermal image and the previous thermal image; and
present, on the display, the processed thermal image.

16. The system of claim 10, wherein the logic device is configured to repeat the receive, the present, the operate, and the extract operations for a plurality of assets.

17. The system of claim 10, wherein the imaging device is a handheld thermal imaging camera.

18. The system of claim 10, wherein the environment is an industrial facility and wherein the asset is temperature-sensitive industrial equipment.

19. The method of claim 1, wherein the settings of the thermal imager are associated with the capturing of the thermal image.

20. The system of claim 10, wherein the settings of the thermal imager are associated with the capture of the thermal image.

* * * * *